Aug. 16, 1955  J. I. BELLAMY ET AL  2,715,719
REMOTE SUPERVISORY AND CONTROL SYSTEM
Filed June 14, 1951  12 Sheets-Sheet 2

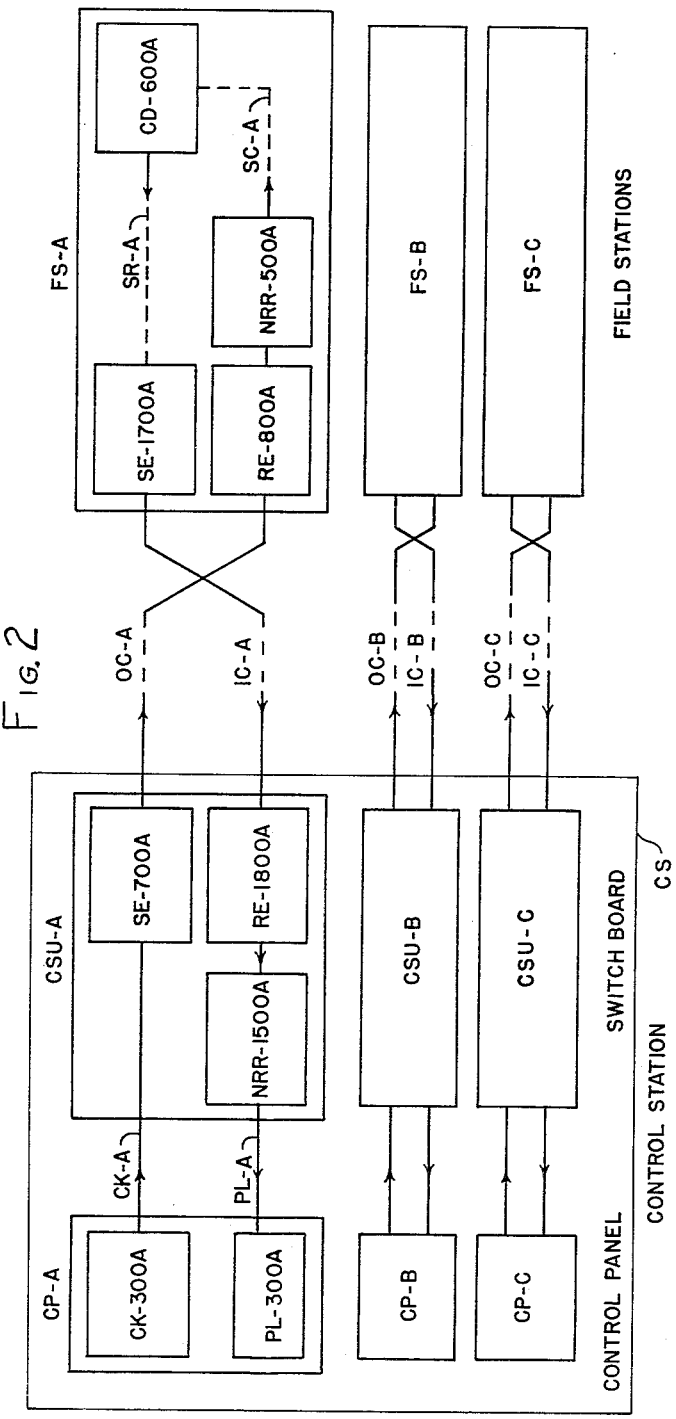
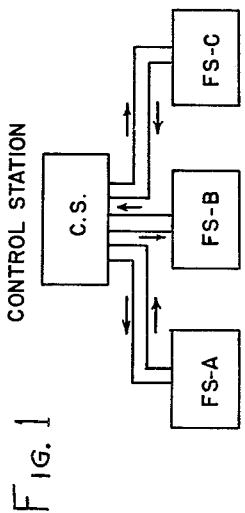

INVENTORS:
JOHN I. BELLAMY
PAUL W. HEMMINGER
BY John J. Bellamy
ATTORNEY

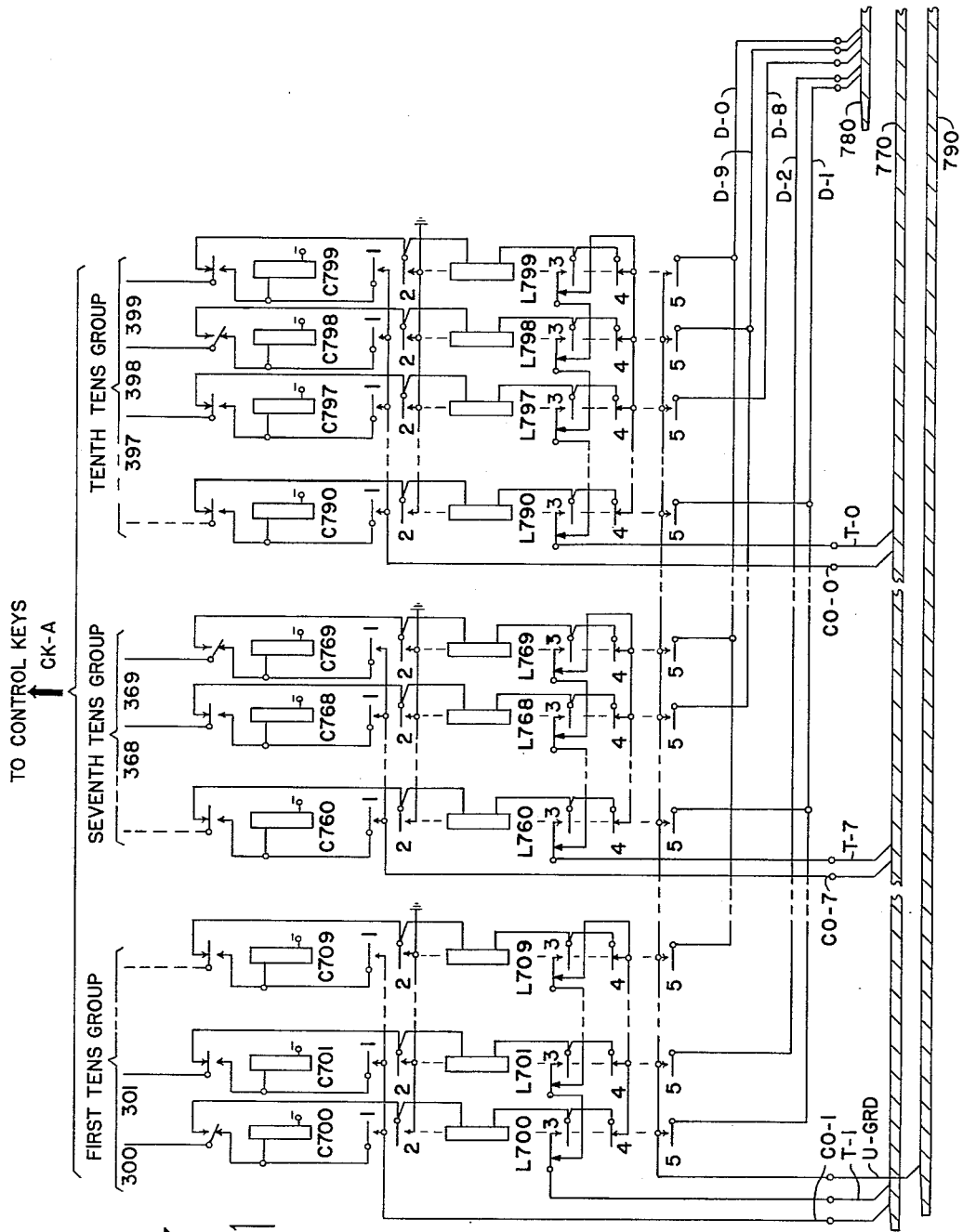

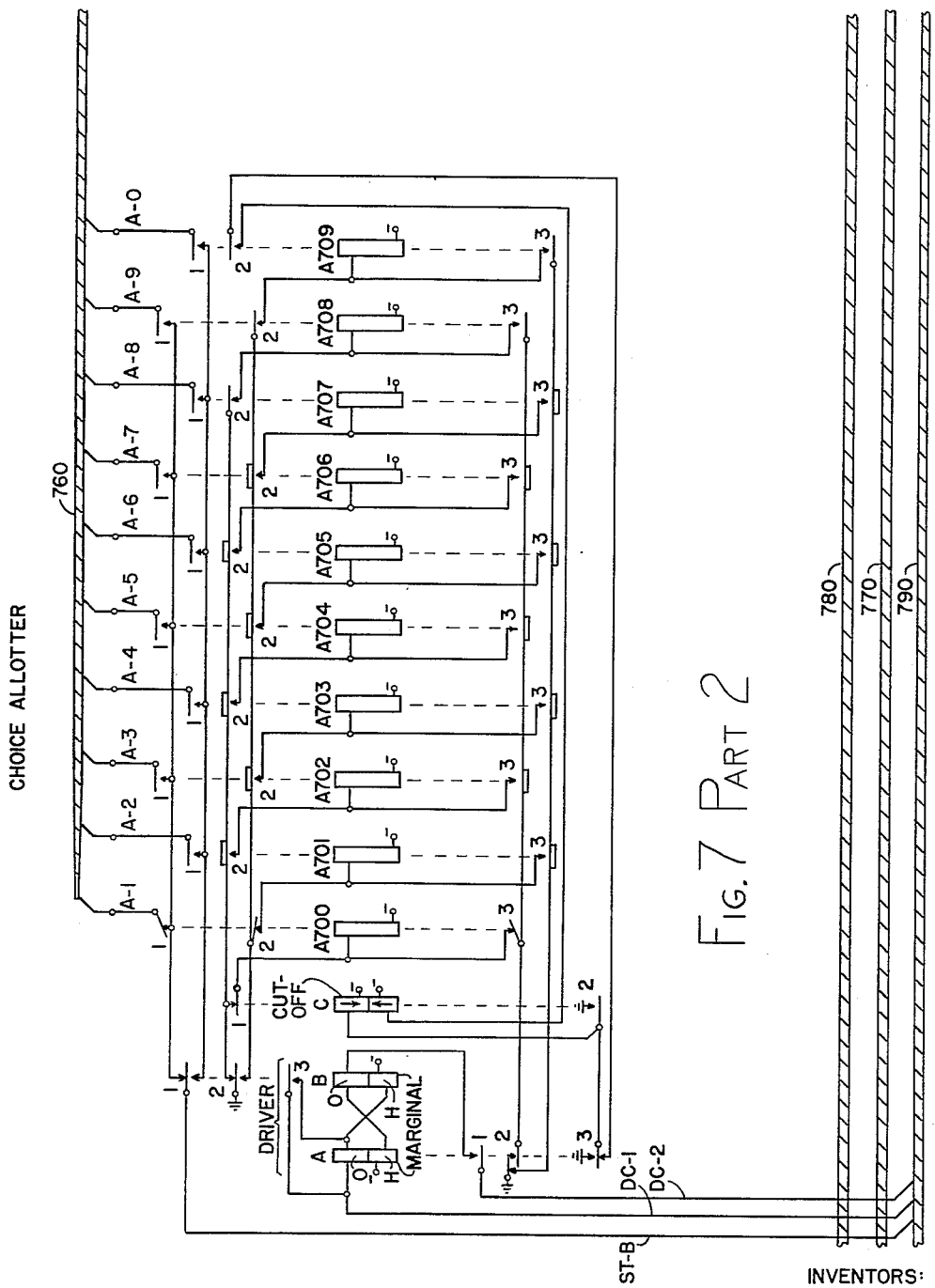

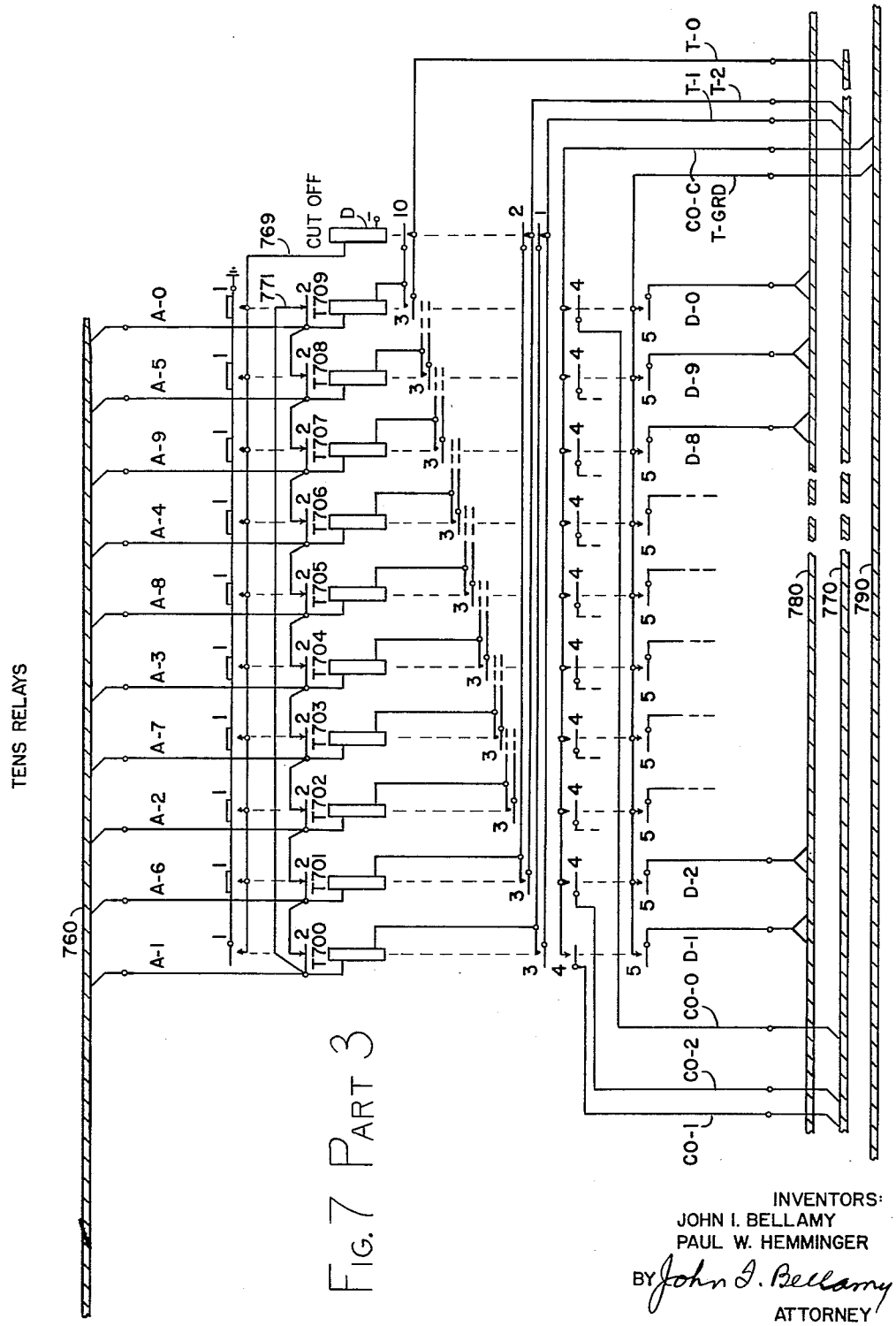

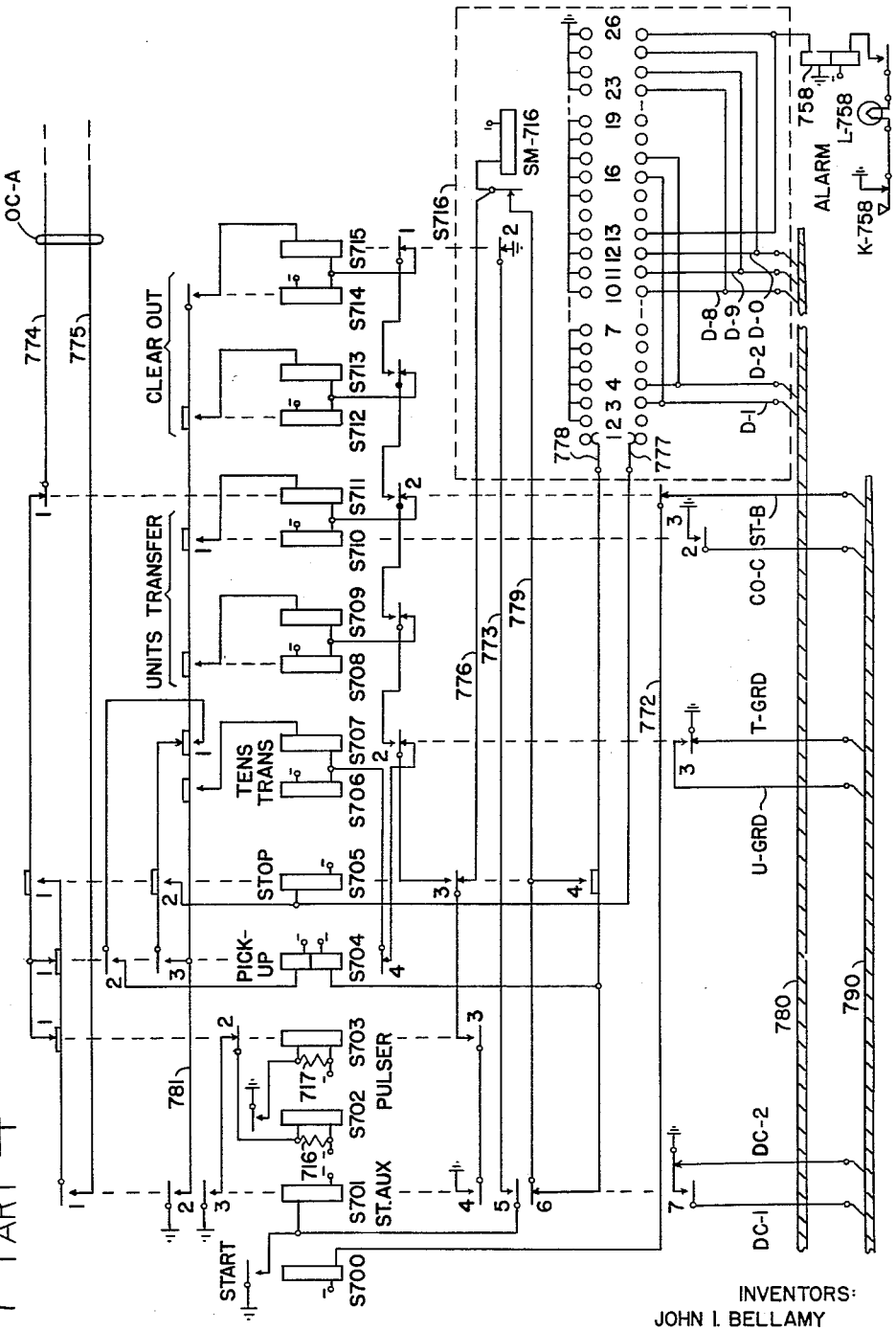

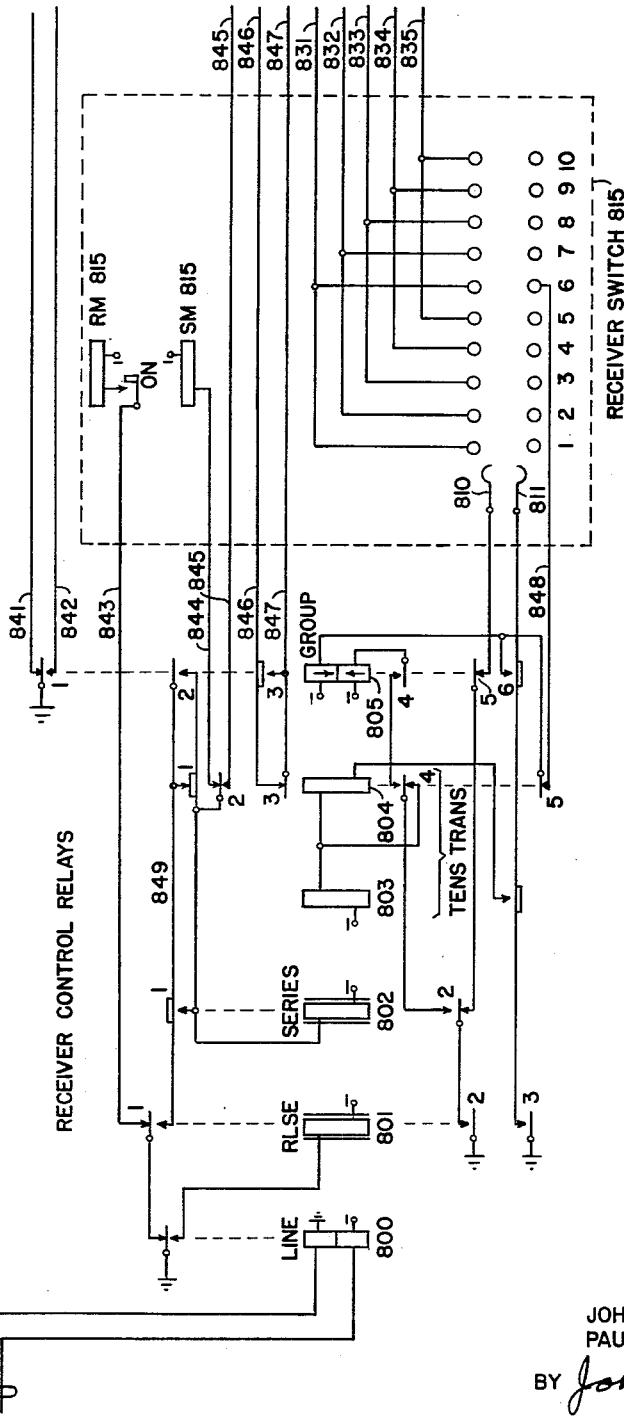

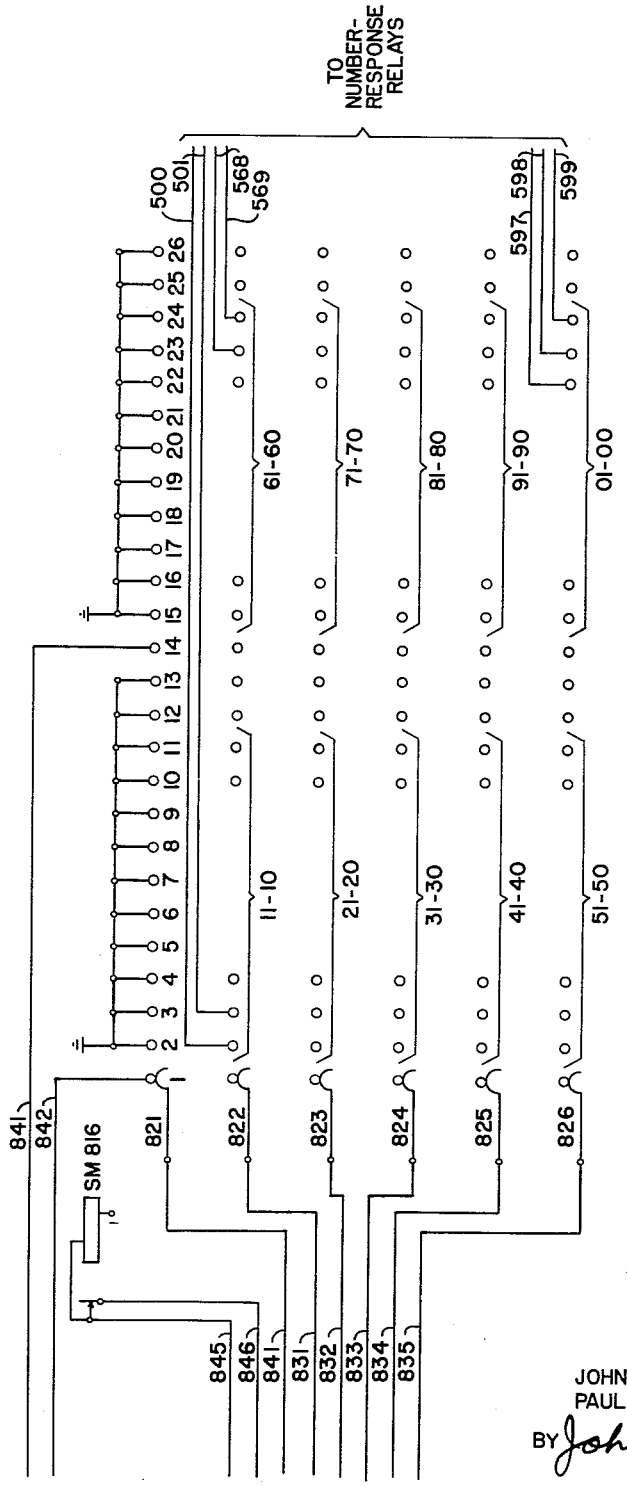

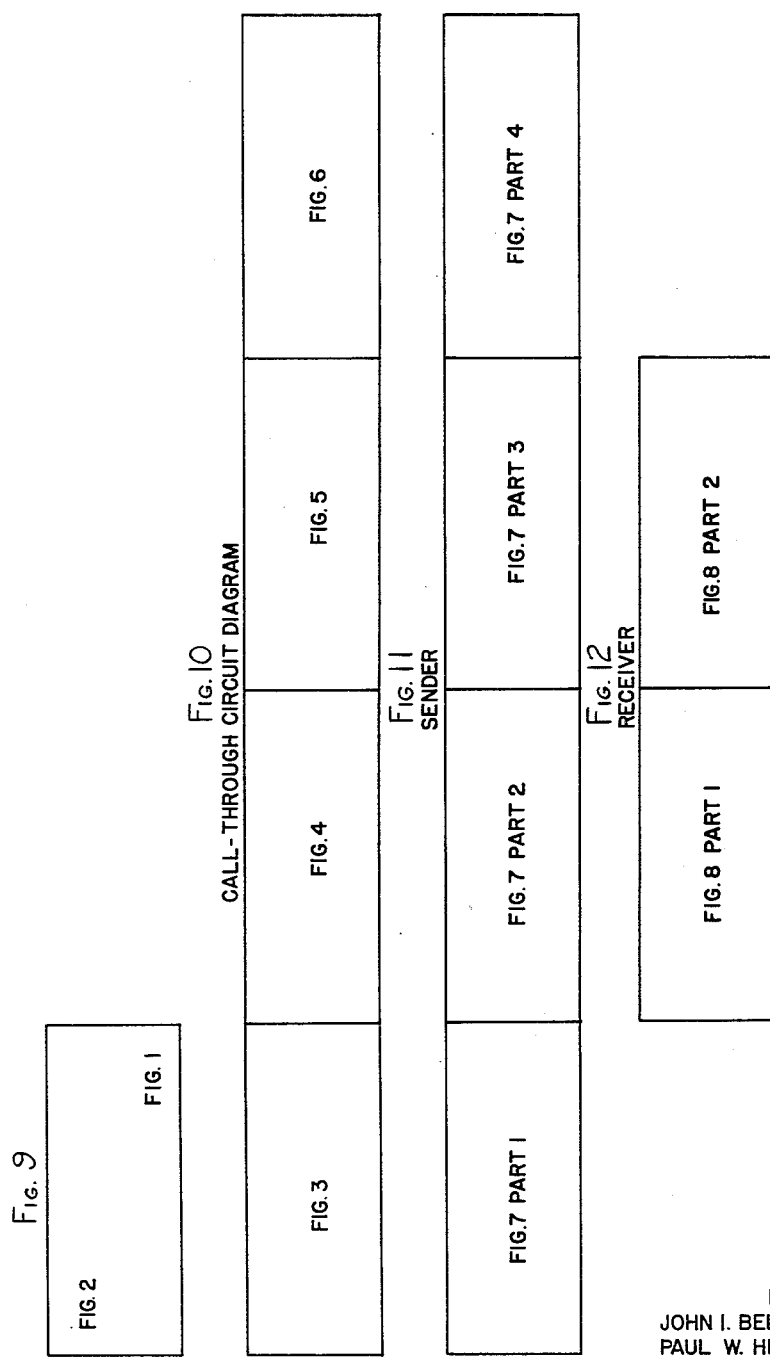

United States Patent Office 2,715,719
Patented Aug. 16, 1955

2,715,719

REMOTE SUPERVISORY AND CONTROL SYSTEM

John I. Bellamy, Wheaton, and Paul W. Hemminger, Calumet City, Ill., assignors, by mesne assignments, to International Telephone and Telegraph Corporation, a corporation of Maryland Application June 14, 1951, Serial No. 231,584

4 Claims. (Cl. 340—163)

This invention relates in general to a remote supervisory and control system. Its principal object is to provide a reliable and economical system of the indicated character which will enable a supervisor or dispatcher at a common, or central, supervisory and control station to observe and exercise control, through field stations, over the operation of a large number of remotely-located devices.

One specific object is to reduce the complexity and diversity of the apparatus. A corresponding feature is that a single design of a control unit may be used in any field station, and in the common station for each field station, to send a separate two-digit code of impulses for each change of position of a dispatcher's control key or for each change of position of a remotely-located field device.

A further corresponding feature is that a single design of a receiver may be used in any field station, and in the common station for each field station, to respond to any two-diigt code of impulses, to close a corresponding change or recording circuit.

A feature specific to the noted receiver design concerns the use of two single-motion stepping switches in tandem to respond respectively to the two digits of any code, to thereby select the corresponding one of a number of local control conductors based on the product of the numbers represented by the steps taken by the switches.

A further feature relates to the use of simple change-recording circuit for each set of change-indicating codes, comprising a single residual-stick relay for a two-code set, and three such relays for a three-code set.

Other objects and features will appear as the description progresses.

General description

It has been chosen to illustrate the invention as embodied in a system wherein the control station serves a group of field stations remotely located along the right-of-way of a railroad track to place the movement of railway traffic under the observation and control of a dispatcher in the common, or control, station. The field stations are assigned to respective adjoining sections of railroad track to effect dispatcher control over the trackside devices thereof, such as switches and control lights. The field stations, in turn, respond to control exercised by the trackside devices in assuming new positions or conditions to send respectively corresponding codes of supervisory impulses to the control station.

The control station is illustrated as being interconnected with each field station by two conventional one-way, oppositely directed, two-wire signal lines to permit the necessary two-way signaling, through the use of two-digit codes of impulse series of the character used in automatic telephone systems.

Arrangement of the system

The general relationship existing between the main items of equipment that together constitute a typical railroad supervisory signaling system is shown in Fig. 2. The supervisory control station includes a switchboard and a control panel board. The switchboard includes a group of control units, each unit being associated with an individual field station over the noted two-wire lines. The control panel includes a group of control panel units, each unit being associated with respective control units of the switchboard. The control panel units mount the necessary keys and lamps for the control and supervision of each item of switchgear of the remotely-located field station. A full schematic diagram of one of the control panels is shown in Fig. 3 of the drawings.

Each remotely-located field station includes a control unit similar to the control unit of the switchboard of the supervisory station, and further includes switchgear or controlled devices, these devices providing the necessary functions for controlling the operation of the trains, such as switching and signaling. For each remotely located field station, the control station has a corresponding switchboard control unit and control panel unit for exercising the desired control and supervision.

The switchgear or controlled devices of each field station are limited to one hundred functions, that is, a two-position switch being two functions, a three-position switch being three functions, and so forth. Therefore, in order to control and supervise all the remotely-located switchgear, the control panel of any one unit is arranged to include a group of keys having one hundred positions, corresponding to the one hundred functions to be performed by the remotely-located field station, and has one hundred position-indicating lamps for visually indicating the positions of the switchgear. Additionally, the control panel has a number of lamps for indicating a change in the position of any switchgear, whether the change was initiated by the dispatcher or the field man.

Briefly, each field station and associated units in the control station provide an arrangement wherein any one of a hundred separate control indications initiated by the control station may be transmitted to remotely-located switchgear to control their operation. The position of each item of switchgear, at all times, is visually indicated at the control station, providing the dispatcher with a ready check to determine the position of each item of switchgear and to verify the response of the switchgear to his transmitted control.

Capacity variations

The capacity of the system varies according to (1) the number of the functions required to be performed by the switch-gear at the remotely field stations and (2) the number of field stations required to be served by the dispatcher's control station.

If, for example, only one field station is required for an installation, only control station unit CSU–A need be installed initially, along with the equipment needed by control panel CP–A to serve the switchgear associated with the one field station. If the initially installed control station unit CSU–A is required to exercise control over a small number of the maximum of one hundred functions performed by the switchgear, the control panel need be equipped only with the necessary keys to perform these functions. Control station units CSU–B and CSU–C together with their respective control panel units, may be subsequently added, all at the same time, or one at a time, as required by the addition of field stations.

The drawings

The accompanying drawings, comprising Figs. 1 to 12, disclose a preferred embodiment of the invention as follows:

Fig. 1 shows three field stations, A, B, and C, each interconnected to a supervisory control station;

Fig. 2 is a single-line block diagram illustrating the apparatus employed in exercising control and supervision from the control station to the respective field stations;

Figure 3:
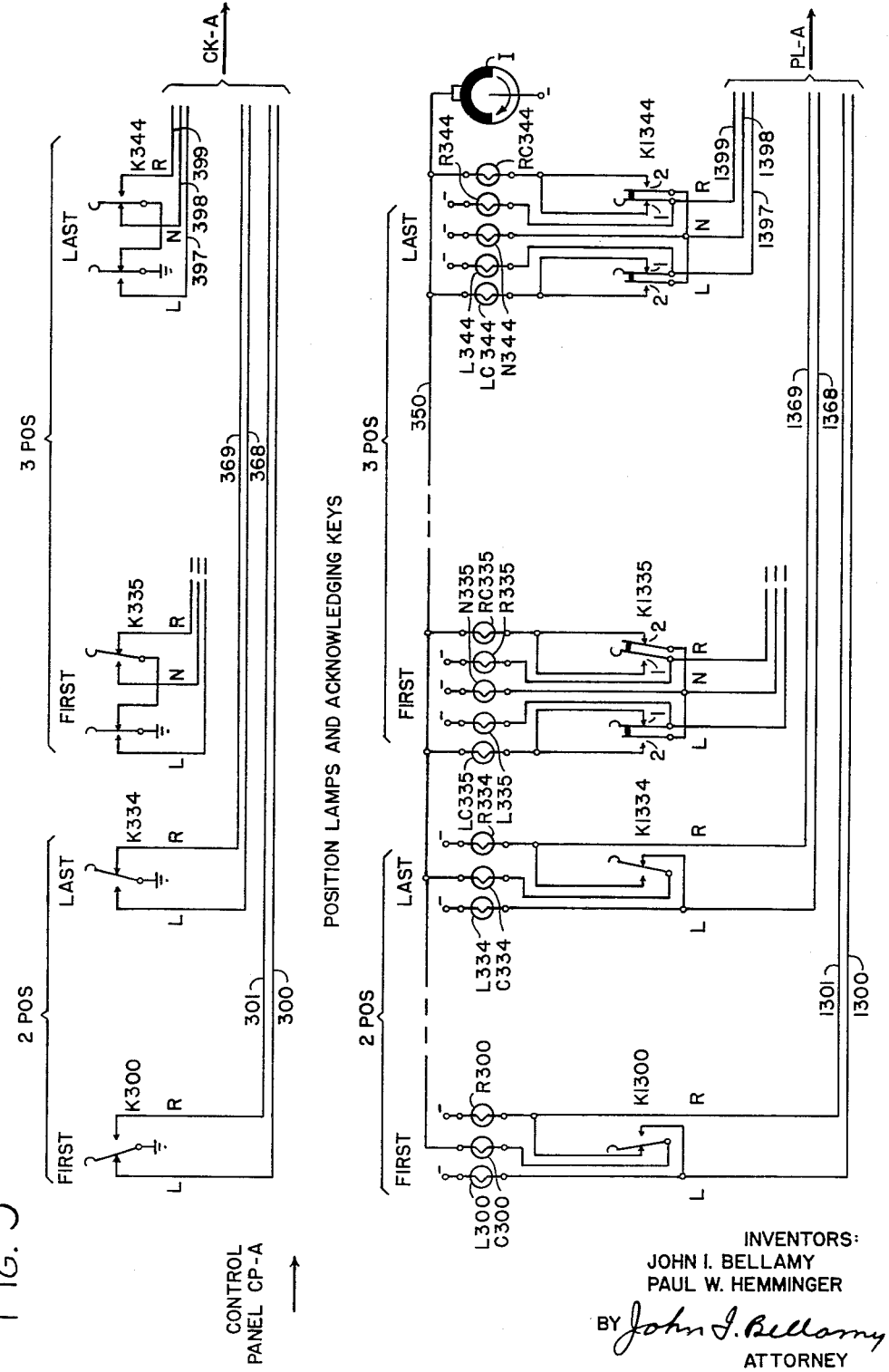
Figure 4:
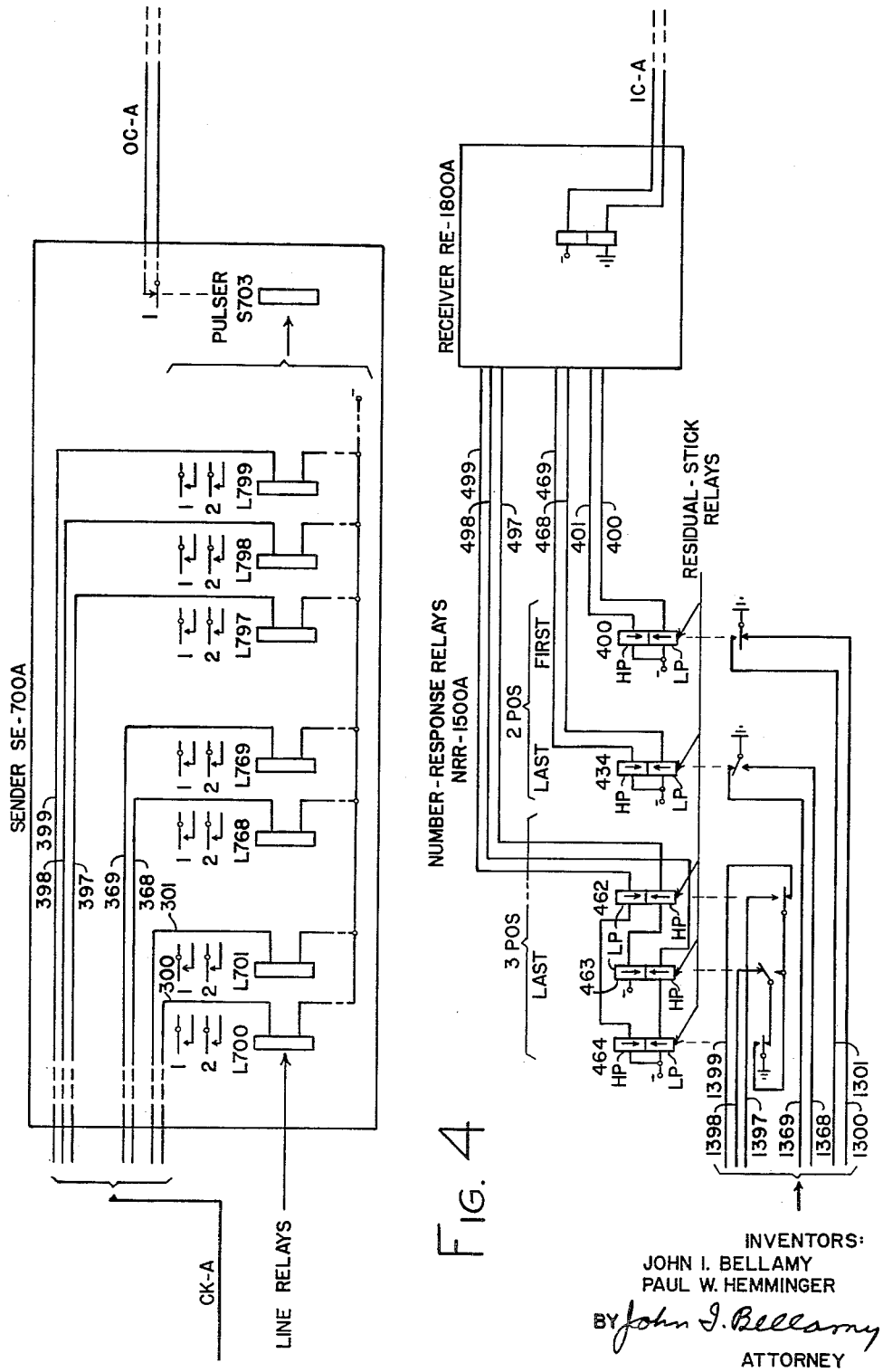
Figure 5:
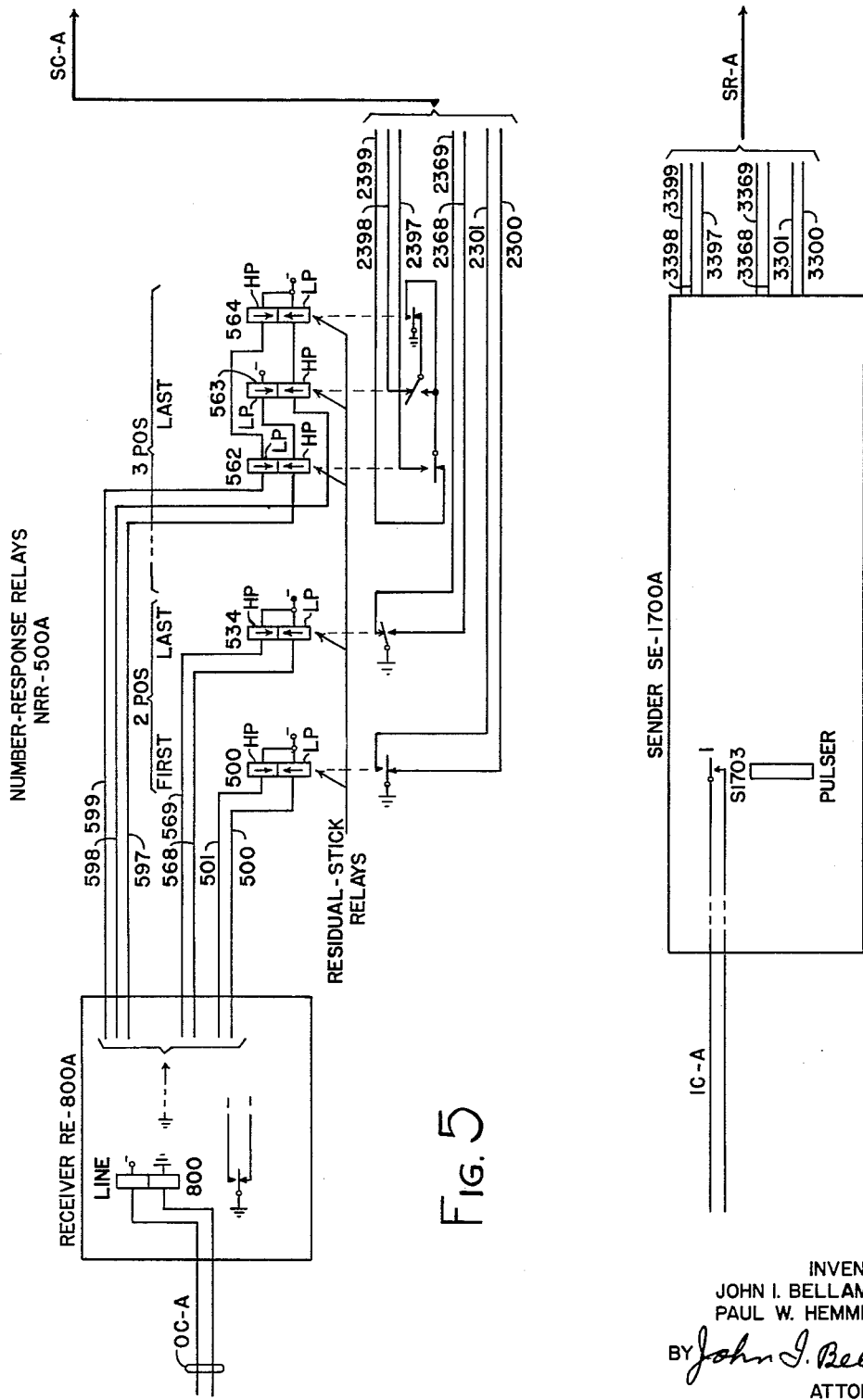
Figure 6:
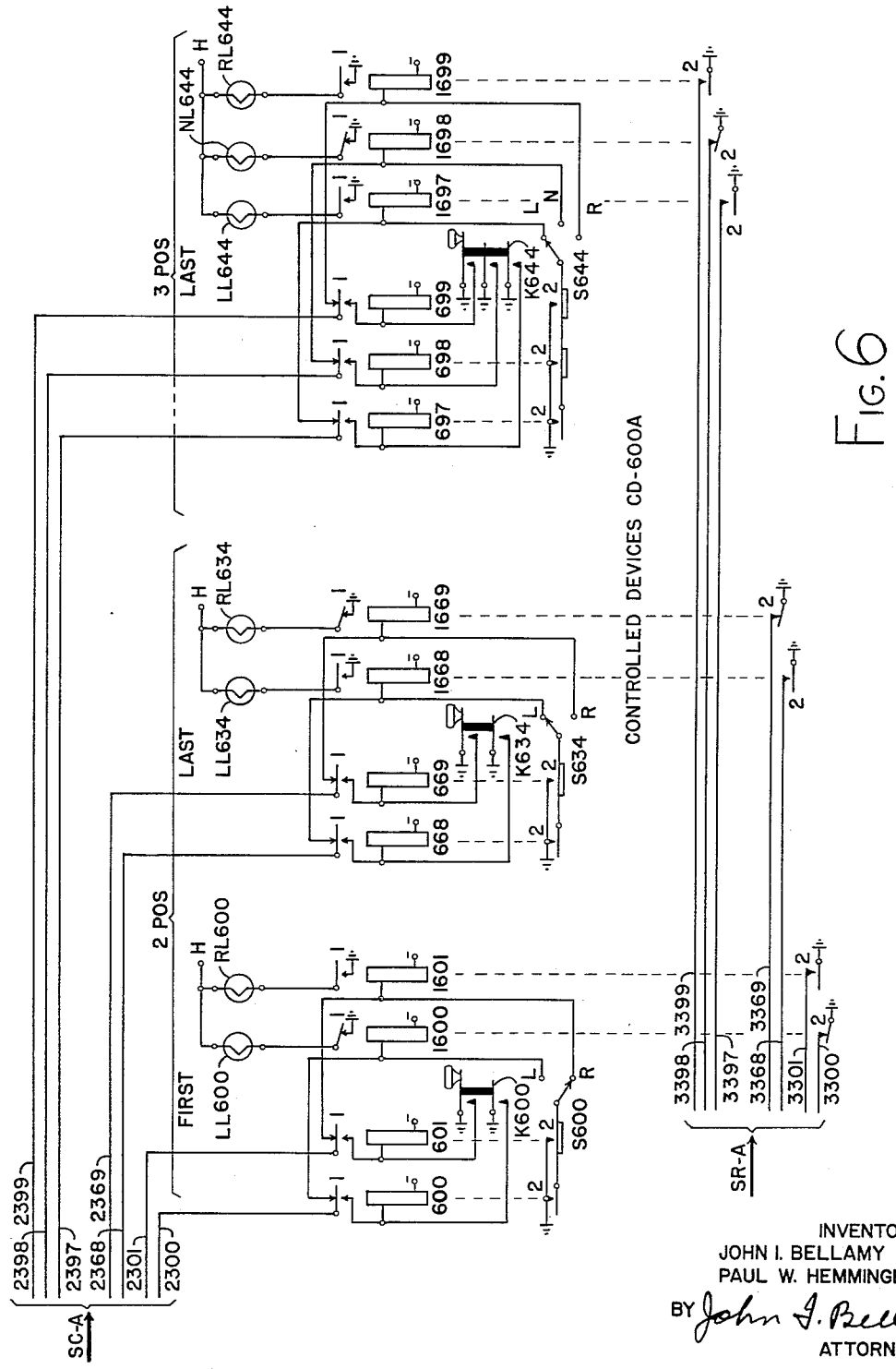

Figs. 3 to 6, taken together, comprise generally a re-drawing of Fig. 2 to show in more detail, the circuit paths and intimately associated electrical equipment employed by the dispatcher in exercising control over the remotely-located field devices;

Fig. 3 shows in circuit detail the apparatus of the control panel units;

Fig. 4 shows in some detail the apparatus of the supervisory control station switchboard units;

Fig. 5 shows in some detail the control apparatus of the field station;

Fig. 6 shows the circuit details of the remotely-located switchgear or controlled devices;

Fig. 7, parts 1 to 4, is a circuit diagram of the sender of any control unit in the control station and of any control unit in the field station;

Fig. 8, parts 1 and 2, is a circuit diagram of the receiver of any control unit in the control station and of any control unit in the field station; and Figs. 9 to 12, show the way in which the sheets of drawings on which Figs. 1 to 8 are drawn, should be arranged in order to be understood best.

The switches shown in Fig. 7, part 4, and Fig. 8, part 2, are rotary switches similar to the rotary switch shown in Fig. 30, page 49 of Miller, "Telephone Theory and Practice," volume III, while the switch of Fig. 8, part 1, is a minor switch similar to the minor switch shown in Fig. 51, page 83 of the noted Miller publication.

DETAILED DESCRIPTION

The invention having been described generally, a detailed description will now be given.

System operation (Figs. 1 and 2)

Fig. 1 shows three field stations FS–A, FS–B, and FS–C, interconnected to a supervisory control station CS over two-way trunk lines.

Referring now to Fig. 2, control station CS includes a switchboard and a control panel, the switchboard including a group of control station units, each being similar to control station unit CSU–A which as illustrated, includes a sender station unit CSU–A which as illustrated, includes a sender SE–700A, a receiver RE–1800A, and number-response relays NRR–1500A. The control panel includes control panels units associated respectively with the switchboard control units. Each control panel unit is similar to control panel unit CPP–A, in which control keys such as K300 and position indicating lamps such as L300 are shown. The field stations FS–A, FS–B, and FS–C, are remotely located from the dispatcher's control station and are associated with respective control station units over respective outgoing and incoming circuits such as outgoing circuit OC–A and incoming circuit IC–A, associated with control station unit CSU–A.

Field stations FS–B and FS–C are similar to field station FS–A in which sender SE–1700A, receiver RE–800A, number-response relays NRR–500A, and controlled devices CD–600A are shown. The controlled devices CD–600A comprise the switchgear along the section of track controlled by the field station. The sender, receiver, and number-response relays of the field station are similar to the corresponding apparatus of the control station.

In the chosen embodiment of the invention, each of the control station units terminate one hundred control-key wires from a group of control keys representing the noted one hundred separate switchgear functions and terminate corresponding position-indicating lamps.

Considering control station unit CSU–A, for example, its purpose is to transmit any one of one hundred control indications from the control keys to its associated field station over outgoing circuit OC–A and to receive, over incoming circuit IC–A, a response indication from the switchgear responding to the transmitted control indications. This response indication is visually displayed on the control panel. For transmitting the noted control indications to its associated field station, the control station unit CSU–A is provided with the sender SE–700A (shown in full in Fig. 7) and for receiving the noted response indications, unit CSU–A is provided with receiver RE–1800A (shown in full in Fig. 8). The number-response relays NRR–1500A (shown in full in Fig. 4) responding to control from the receiver provides the visual indication noted hereinbefore.

Receiver RE–800A of field station FS–A receives the transmitted control indications from the sender of control station unit CSU–A and together with number-response relays NRR–500A, cause the switchgear CD–600A to respond to the received control from the dispatcher. The switchgear responding to received control, sends (by sender SE–1700) an indication of its operation to the receiver of the associated control station unit, whereupon the position of the switchgear is visually displayed.

Switchgear control (Figs. 3 to 6)

The operation of the system in controlling and supervising the remotely-located switchgear will now be described with particular reference to Figs. 3 to 6, which show in more circuit detail, the apparatus indicated on Fig. 2. It will be noted that the equipment shown in Figs. 3 and 4, is the equipment located at the supervisory control station, while the equipment shown in Figs. 5 and 6 is the equipment of the field station and its associated switchgear.

It has been chosen to illustrate the switch-control system as one containing sufficient apparatus to provide thirty-five (35) two-position switching indications and to provide ten (10) three-position switching indications.

As seen in Fig. 3, the control keys and the acknowledging keys of control panel CP–A are divided into two groups, a group of thirty-five two-position keys, such as keys K301 and K1301, and a group of ten three-position keys such as keys K337 and K1337. Only the first and last keys of each group are shown. These keys are of the locking type and when operated to any position, will remain in that position until manually changed. Each of the two-position keys has a left position L and a right position R, while each of the three-position keys, in addition to the right and left positions R and L has a neutral position N. The three-position keys are so arranged that, in normal operation, changing from the left position L or the right position R to the other extreme position, the neutral position N will be passed ineffectively.

The control keys exercise control over the relays of the assoicated sender, such as sender SE–700A, by placing ground potential on the associated control wires, such as wires 300 and 301 of the two-position keys and wires 397, 398, and 399 of the three-position keys.

For each control key on the control panel unit, there is a corresponding acknowledging key. Associated with each acknowledging key is a corresponding group of position lamps, comprising both position-indicating lamps and position-change lamps. Each two-position acknowledging key has a left and a right position indicating lamp, such as L301, and R301, and a position-change lamp, such as C301. Each three-position acknowledging key has associated with it a left, a neutral, and a right position-indicating lamp, such as L337, N337, and R337, and a left and a right position-change lamp, such as LC337 and RC337.

Each of the position-indicating lamps has one side connected to a constant battery potential and the other side connected to its associated acknowledging key, while the position-change lamps have one side commoned to an interrupted battery potential supplied by interrupter I and the other side connected to the acknowledging key associated with the change lamps. Therefore, if ground potential is placed to the position-indicating lamps from the associated acknowledging keys the position-indicating lamps will burn steadily, while if ground potential is supplied to the position-change lamps through contacts of the associated acknowledging keys, the position-change lamps will flash intermittently. In this way, when the position-change lamps are lit, the attention of the dispatcher will be easily attracted.

Referring now to Fig. 4, it will be observed that sender SE–700A and receiver RE–1800A disclose only a portion of the equipment needed in transmitting and receiving the hereinbefore noted control and response indications to and from the remotely-located field stations. As previously pointed out, the sender SE–700A is shown in full in Fig. 7, parts 1 to 4 and the receiver RE–1800A is shown in full in Fig. 8, parts 1 and 2. Both the sender SE–700A and receiver RE–1800A will be described in detail hereinafter.

The number-response relays NRR–1500A of Fig. 4 are the same as the number-response relays NRR–500A of Fig. 5. Both groups, NRR–1500A and NRR–500A, are shown for purposes of clarity in describing the control and supervisory operations of the system.

Referring now to the number-response relays NRR–1500A, it will be observed that the number-response relays are divided into two groups, namely, two-position and three-position groups. Of the two-position group, only the first and the last relay is shown, while in the three-position group, only the last relays are shown. Relays 462, 463 and 464 together constitute the number-response relay equipment required to perform the necessary functions of three-position control as will hereinafter be described.

The number-response relays are controlled by the apparatus of the receiver RE–1800A, or as in Fig. 5, by receiver RE–800A. This control is exercised over control wires such as 401 and 400, for the two-position relays or over wires such as 497, 498 and 499 for the three-position relays. Contacts on the number-response relays control the position lamps of Fig. 3, over wires such as 1300 and 1301 for the two-position keys and lamps and over wires such as 1397, 1398, and 1399 for the three-position keys and lamps.

Number-response relays, such as 400, 434, 500 and 534 are herein referred to as residual-stick relays. Such a relay, upon being open-circuited after operation, retains sufficient residual magnetism to hold its armature operated against its spring load until the residual magnetism is neutralized. Each such relay has tandem windings, differentially connected, one winding, designated HP, having sufficient turns to operate the associated relay when energized and the other winding, designated LP being of insufficient power to operate the associated relay but being of sufficient power to neutralize the residual magnetism of the HP winding, causing the associated relay to restore, if operated.

Referring now to Fig. 5, it will be observed that the number-response relays NRR–500A are similar to number-response relays NRR–1500A of Fig. 4 and as previously pointed out, are shown here for purposes of clarity. As hereinbefore noted, receiver RE–800A and sender SE–1700A are similar to receiver RE–1800A (Fig. 8) and sender SE–700A (Fig. 7).

Fig. 6 discloses a preferred embodiment of switchgear applicable for use in the remotely-located field stations. It has been chosen to illustrate the switchgear as performing signaling functions only, although it is understood that the signaling control wires could control switches as well.

Relays 600 and 601, together with their associated relays 1600 and 1601 constitute the control equipment required for performing the two-position signaling, while relays 697, 698, and 699, together with their associated relays 1697, 1698, and 1699 constitute the equipment required for performing the three-position signaling. Associated with each two-position items of switchgear (such as relays 600, 601, 1600, and 1601) is a field key such as K600 and a field switch such as S600, while associated with each three-position items of switchgear (such as relays 697, 698, 699, 1697, 1698 and 1699) is a field key such as K644 and a field switch, such as S644. The operation and purpose of these keys and switches will be described hereinafter.

The signal lights, such as RL600 and LL600, and RL644, NL644 and LL644 by the corresponding two-position relays, such as 600 and 601, and by the corresponding three-position relays, such as 697, 698, and 699. These relays are controlled by the number-response relays NRR–500A over one hundred wires, of which wires such as 2300 and 2301 control the two-position relays and wires such as 2397, 2398, and 2399 control the three-position relays. Contacts on the two-position and three-position relays exercise control over sender SE–1700A of Fig. 5 over the concerned ones of the one hundred control wires such as 3300 and 3301.

*Two-position control and supervision by dispatcher*

Referring now to Figs. 3 to 6 taken together, it will be observed that control key K300 and acknowledging key K1300 of Fig. 3 are in the left position L. Accordingly, number-response relay 500 of Fig. 5 is in a restored position and relay 1600 of Fig. 6 is in an operated position, while relay 400 of Fig. 4 is in a restored position. With these keys and relays in the illustrated positions, signal light LL600 and position-indicating lamp L300 are lit.

Operation of key K300 from the left position L to right position R, removes ground potential from wire 300 and places it on wire 301. This ground potential is extended over wire 301 in control key cable CK–A to the sender SE–700A of the switchboard control unit CSU–A. As will hereinafter be described with reference to Fig. 7, this ground potential on wire 301 operates the associated line relay 701, which together with associated equipment in the sender marks the key and its position and transmits "dial impulses" (by operation of the pulser relay) to receiver RE–800A of the associated field station over outgoing circuit OC–A. These "dial impulses," comprising two digits, correspond in number to the "tens" and "units" location of the marked key and key position.

Receiver RE–800 responds to the transmitted "dial pulses" (by operation of line relay 800) and as will be hereinafter described in reference to Fig. 8, places ground potential on the winding of the number-response relay corresponding to the marked control key and its marked position. Wire 501 of receiver RE–800A corresponds to wire 301 of the right position R of control key K300, therefore, wire 501 is grounded and the winding HP of relay 500 is energized.

As hereinbefore noted, energization of winding HP of any number-response relay, causes it to operate. Therefore number-response relay 500 operates and at its contacts removes ground potential from wire 2300 and places it on wire 2301. These wires interconnect number-response relays NRR–500A with controlled devices CD–600A over switchgear control cable SC–A.

Referring now to the Fig. 6, the removal of ground potential from wire 2300 allows relay 1600 to release, and at its contacts 1, relay 1600 extinguishes the left signal lamp LL600. This ground potential appearing on wire 2301 operates relay 1601, through back contacts of relay 601, which at its contacts 1, lights the right signal lamp RL600.

The switchgear at the remotely-located field station has responded to the moving of the control key K300 from the left position L to the right position R by lighting the right signal light RL600 and extinguishing the left signal lamp LL600. In addition to performing the signaling functions, the switchgear visually indicates to the control station that it has responded to the transmitted control. The switchgear response indication is transmitted to the control panel of the control station in a manner similar to the transmission of the control indications from the control station to the switchgear as will now be explained.

The restoration of relay 1600 and the operation of relay 1601, at their respective contacts 2, remove ground potential from wire 3300 and place it on wire 3301. Wires 3300 and 3301 are wires of the one hundred wires in the switchgear response cable SR–A. This cable interconnects the controlled devices or switchgear CD–600A with the field station sender SE–1700A.

Sender SE–1700A of field station FS–A responds to ground potential on any wire cable SR–A similar to the manner in which sender SE–700A of the control station CS responded to ground potential on any wire in cable CK–A.

The response of sender SE–1700A marks the item of switchgear and its position, whether right or left, and transmits "dial pulses" constituting a two-digit number which corresponds to the marked switchgear and its marked position. These "dial pulses" are transmitted to receiver RE–1800A of the control station over the pair of wires of incoming circuit IC–A.

Receiver RE–1800A responds to the received "dial pulses" by placing a ground potential on the winding of the number-response relay of NRR–1500A corresponding to the marked item of switchgear and its marked position. Wire 401 of receiver RE–1800A corresponds to wire 3301 of the right-position relay 1601 of the switchgear apparatus, therefore wire 401 is grounded and the HP winding of number-response relay 400 is energized.

Number-response relay 400 operates responsive to the energization of its HP winding and at its contacts, removes ground potential from wire 1300 and places it on wires 1301. Wires 1300 and 1301 are wires of the one hundred wires in position-lamps cable PL–A. This cable interconnects the number-response relays NRR–1500A with the acknowledging keys and the lamps of the control panel CP–A.

The transfer of ground potential from wire 1300 to wire 1301 extinguishes the left position lamp L300 and lights the right position lamp R300. This ground potential is also placed through contacts 1 of acknowledging key K1300 to the one side of position-change lamp C–300 causing it to flash intermittently according to the interrupted battery potential on wire 350 extending to interrupter I.

The dispatcher observing the flashing change lamp C300 acknowledges the position-change of the switchgear indicated by this change lamp by throwing acknowledging key K1300 from the left position L to the right position R. Contacts on key K1300 remove ground potential on wire 1301 from the change lamp, extinguishing it.

The control exercised by the dispatcher over the remotely-located switchgear is completed and the position of the acknowledging key K1300 is the same as its associated control key K300, both in the right position R.

*Dispatcher three-position control and supervision*

Referring again to Figs. 3 to 6 taken together, it will be observed that control key K344 and its associated acknowledging key K134 are in the neutral position N. Accordingly, number-response relay 563 of Fig. 5 and relay 463 of Fig. 4 and relay 1698 of Fig. 6 are in operated condition. With these keys and relays in the illustrated positions, signal light NL644 and position-indicating lamp N344 are lit.

Operation of key K344 from the neutral (illustrated) position N to the right position R, removes ground potential from wire 398 and places it on wire 399. This ground potential is extended over wire 399 in control key cable CK–A to the sender SE–700A, which as will hereinafter be described, transmits "dial pulses" to receiver RE–800A which causes ground potential to be placed on wire 599, extending to the HP winding of relay 564.

Relay 564 operates and at its contacts remove ground potential from wire 2398 and places it on wire 2399, extending to the switchgear CD–600A of Fig. 6. The removal of ground potential from wire 2398 allows relay 1698 to restore. At its contacts 1, relay 1698 extinguishes the neutral signal lamp NL644. The ground potential appearing on wire 2399 operates relay 1699 through back contacts of relay 699, thereby lighting the right signal light RL644.

The switchgear has responded to the moving of control key 344 from the neutral position N to the right position R by extinguishing the neutral signal light NL644 and lighting the right signal light RL644. The response indication of the switchgear is transmitted to the control panel of the control station to provide a visual indication of the switch operation.

The restoration of relay 1698 and the operation of relay 1699, at their respective contacts 1, remove ground potential from wire 3398 and transfer it to wire 3399. Sender SE–1700A responds to the ground potential on wire 3399, as will be described in full hereinafter, by transmitting "dial pulses" to the receiver in the control station over incoming circuit IC–A.

The receiver RE–1800A responds to the received "dial pulses" by placing ground on the HP winding of number-response relay 464, the relay corresponding to the marked switch and its marked position.

Number-response relay 464 operates responsive to the energization of its HP winding, and restores relay 462, if operated, by the energization of its LP winding. Contacts on relay 464 remove ground potential from wire 1398 and place it on wire 1399, thereby extinguishing the neutral-position lamp R344. The ground potential on wire 1399 is extended through contacts 3 of acknowledging key K1344, lighting the right position lamp R344 and the right position-change lamp RC344. Lamp RC344 flashes intermittently according to the flashing battery potential from interrupter I.

The dispatcher observing the flashing change lamp acknowledges the switchgear position-change indicated by this lamp by throwing key K1344 to the right position R. The moving of this key from the neutral position N to the right position R, opens contacts 3 of key K1344, extinguishing the right change lamp RC344. The acknowledging key K1344 and associated control key K344 are both in the same position and the control exercised by the dispatcher over the switchgear is completed.

*Field man control of switchgear positions*

The switchgear such as CD–600A of Fig. 6 is so arranged that a field man, located at any field station may exercise control over any item of switchgear associated with that particular field station, independent of the dispatcher control. The supervision of the switchgear will be available to the dispatcher at the supervisory control station in the manner hereinbefore described. The control over the switchgear CD–600A of field station CS–A by a field man will now be described with reference to Fig. 6.

In the illustrated embodiment, it will be observed that ground potential from contacts of relay 500 of Fig. 5 (relay 500 is restored as control key K300 is in the left position) is present on wire 2300, thereby maintaining relay 1600 operated through back contacts of relay 600. Accordingly, the left signal light LL600 is lit.

If the field man at field station FS–A desires the right signal light to be lit in place of the left signal light, the pointer of selector switch S600 is set to the right position R and the associated non-locking operate key K600 is momentarily operated. Ground potential from make contacts on key K600 is extended to the windings of relays 600 and 601, operating them. The make contacts 1 of each of these relays connect the associated wires 2300 and 2301 to the windings of their respective relays. As pointed out above, ground potential is present on wire 2300 therefore it locks its associated relay 600 operated. Relay 1600 restores incidental to the operation of relay 600 and the left signal lamp LL600 is extinguished. When key K600 restores after its momentary operation, relay 600 remains operated (locked to ground potential on wire 2300) and relay 601 restores. Make contacts 2 of relay 600 extend ground potential through selector switch S600 to the winding of relay 1601. Relay 1601 operates and at its contacts 1, place ground potential on right signal light RL600, lighting it. Contacts 2 of relay 1601, place ground potential on wire 3301 extending to sender SE–1700A of Fig. 5 which transmits a position-change indication to the control panel of the control station in the manner previously described.

The item of switchgear selected by the field man, responded to the control exercised over it by changing the signal light and by transmitting a position-change indication to the dispatcher. The dispatcher control over the position-change initiated by the field man will be hereinafter described.

The position-change of any item of three-position switchgear by the field man is similar to the two-position switchgear position-change hereinbefore described. The operation of the selector switch and associated key, such as switch S644 and K644 causes relay 698 to lock operated to ground potential on wire 2398, extinguishing the lit signal light NL634 and causing the selected relays, such as relay 1697 to operate (selector switch S644 setting in the illustrated position L) to light the associated signal light. The position-change of the switchgear associated with signal lights such as LL645, NL645, and RL645 is transmitted to the control panel, notifying the dispatcher of the change.

*Dispatcher response to field man switchgear control*

As hereinbefore pointed out, a position-change of any item of switchgear by the field man at the remotely-located field station is indicated on the control panel at the control station. The dispatcher observing the change acknowledges it by throwing the associated acknowledging key to the new position assumed by the switchgear, thereby extinguishing the flashing change lamp which necessarily lit following the position-change. The dispatcher thereafter operates the control key associated with the switchgear controlled by the field man, to the position corresponding to the position assumed by the switchgear. As previously described, operation of any control key causes the control station sender to control the receiver of the associated field station to cause ground potential to be transferred from the wire associated with the position of the control key before its last operation to the wire associated with the new position of this control key. This causes the control exercised by the field man to be now controlled by the dispatcher although the position of the switchgear has not been changed.

For example, assuming the position change initiated by the field man to be the signal change of signal light LL600 to RL600, the position-change lamp C300 of Fig. 1 flashes intermittently. The dispatcher thereupon operates acknowledging key K300 extinguishing the position-change lamp C300. Operation of control key K300 from the left position L to the right position R causes the sender SE700A to control the receiver RE800A to operate number-response relay 500. Contacts on relay 500 remove ground potential from wire 2300 and transfers it to wire 2301. The removal of ground potential from wire 2300, restores relay 600 (locked operated incidental to the operation of key K600) thereby removing the ground potential from the winding of relay 1601, placed there by selector switch S600. However, ground potential from wire 2301 is now extended through back contacts of relay 601 maintaining relay 601 operated. Therefore, the right signal light RL600 is lit according to the control exercised by the field man but signal light RL600 is now under control of the dispatcher over wire 2301 of the number-response delays. The position of all the acknowledging keys and associated control keys are the same. If the dispatcher is opposed to the switchgear position set by the field man, he may change the position of that particular item of switchgear by operating the associated control key to initiate a change, in the manner previously described for dispatcher switchgear control.

The dispatcher may assume control over any item of three-position switchgear, changed by the field man, in a manner similar to the above described two-position dispatcher control.

*Sender operation (Fig. 7)*

The operation of sender SE700A in transmitting the dispatcher's control to the remotely-located switchgear will now be described with reference to Fig. 7, parts 1 to 4.

Referring now to Fig. 7, part 1, it will be observed that the line and cutoff relays, such as line relay L700 and cutoff relay C700, are divided into ten groups of ten relays, of which only the first seventh, and tenth groups are shown. In the first tens group, only the first, second, and last line and cutoff relays are shown; in the seventh tens group only the first, ninth and tenth relays are shown; and in the tenth tens group only the last three relays are shown.

As hereinbefore pointed out, it was chosen to disclose the system as one in which thirty-five two position switching indications and ten three-position switching indications are provided. For each switching indication, there is one line relay and one cutoff relay. Therefore the first seventy line and cutoff relays constitute the first seven tens groups while the last thirty relays constitute the last ten groups. Since the first and last control keys of the two-position keys and the last control key of the three-position keys are shown only the line relays and cutoff relays associated with these keys are shown. All line and cutoff relays not shown are assumed to be as the same of the relays illustrated.

The armature of the contact sets of each cutoff relays is interconnected to its associated control key by control wires in control key cable CK–A. Cutoff relay C700 is connected to wire 300, relay C701 is connected to wire 301, relay C768 is connected to wire 368 and so forth. Therefore, in the illustrated embodiment, ground potential in on the armatures of the contact set of relays C700, C769, and C798. The line relays mark the individual control key, and its position, operated by the dispatcher in initiating a change in the position of any item of remotely-located switchgear. This marking is accomplished by placing ground potential from units ground wire U–GRD on the associated one of the digit wires D–1 to D–0 extending to the sender switch of Fig. 7, part 4, over cable 780.

The cutoff relays operate incidental to the completion of the sender in transmitting control indications to the switchgear and at their contacts release the sender for use by other control keys in transmitting other control indications to the remotely-located switchgear.

Fig. 7, part 2 discloses a choice allotter for shifting first choice successively among the ten line and cutoff relays tens groups. The choice allotter is a specialized counting chain arranged to assume allotting positions 1 to 10 successively in cycles. The allotting relays are A700 to A709. They are controlled by driver relays A and B over odd and even control wires. Relay C is a cutoff relay employed to disconnect relay A700 when relay A701 operates, and to hold it disconnected until a new cycle of operations is about to begin. The choice allotter is illustrated in position 1, and the first allotter relay A700 stands operated. The illustrated choice allotter is as shown and described in the Boyer and Bellamy application for an Endless Chain of Counting Relays, Serial No. 134,448, filed December 22, 1949.

Fig. 7, part 3, discloses the tens relays T700 to T709 and their associated cutoff relay D. Each tens relays is associated with its respective tens group of line and cutoff relays over tens wires T–1 to T–0 of cable 770 and associated with the choice allotter over wires A–1 to A–0 of cable 760.

The tens relays mark the tens group that includes the line and cutoff relays associated with the control key initiating a change in the remotely-located switchgear.

The tens relays together with the line relays of the marked tens group, mark the tens and units location of the change-actuating control key and its position.

Fig. 7, part 4, discloses the sender control relays S700 to S714 together with the sender switch S716. These relays and switch transmit "pulses" to the associated field station, according to the marked tens and units wires, thereby controlling the switchgear according to the setting of the control keys.

In the illustrated embodiment, cutoff relay C700 of Fig. 7, part 1 is shown operated. Ground potential from the contact of the control key K300 is present on wire 300, extending to the cutoff relay C700 of Fig. 7, part 1, maintaining it operated.

Operation of control key K300 from its left position L to its right position R transfers ground potential from wire 300 to wire 301 as hereinbefore described. The transfer of ground potential from wire 300 to wire 301 restores cutoff relay C700 and places ground potential to the winding of line relay L701 through back contacts 1 of relay C700. The other winding of relay L701 is connected to tens wire T–1 through its break contacts 4 and through the series make-before-break contacts 3 of all the line relays in the first tens group.

Tens group wire T–1 extends to the winding of its associated tens relay T700 over cable 770 and through break contacts of cutoff relay D. The other side of the winding of relay T700 is connected to wire A–1 which extends to the choice allotter over cable 700. This wire extends through make contacts 1 of the operated even-numbered allotter relay (relay A700 illustrated in its operated position) and through back contacts 1 of driver relay B to start wire ST–B.

Start wire ST-B extends over cable 790, through contacts 2 of units transfer relay S711, and through the winding of start relay S700 to battery potential.

Therefore the line relay associated with the control key initiating the switchgear control is connected in series with the tens relay of the tens group including the concerned line relay and with the start relay S700 of the sender control relays. Ground potential appearing on the winding of any line relay causes the concerned line relay, the associated tens relay and the start relay to operate in series. The noted transfer of ground potential from wire 300 to wire 301 causes cutoff relay C700 to restore and causes line relay L701, tens relay T700 and start relay S700 to operate.

If control key K334 is operated from its illustrated right position R to its left position L, cutoff relay C769 restores and line relay L768 operates in series with the associated tens relay T706 and start relay S700. The winding of the tens relay T706 is connected to start wire ST–B (with the choice allotter in its illustrated first position) through break contacts 2 of relays T700 to T705, over allotter wire A–1, through contacts 1 of allotter relay A700 and through contacts 1 of driver relay B.

If two control keys, associated with the line and cutoff relays of the same tens group, are operated at the same time, the noted make-before-break contact series of the line relays give preference to the control key associated with the lower numbered line relay. For example, if ground potential is placed on the windings of relays L700 and L709 at the same time, the operation of relay L700 opens the operate path of relay L709, giving relay L700 preference.

If two control keys, associated with the line and cutoff relays of any two different tens group, are operated at the same time, the tens relays associated with the operated control keys both start to operate, but the first such relay in the current order of preference opens the preference chain (at its break contacts 2) to prevent effective operation of any succeeding one.

Assuming now that relays L701, T700, and S700 operate responsive to the operation of control key K300 from the left position L to the right position R, then contacts 3 of line relay L701 opens the operate path of all other line relays in the first tens group and at its contacts 2 locks itself operated independent of the ground on wire 302.

The operation of tens relay T700, operates the cutoff relay D through its make contacts 1. Cutoff relay D, at its break contacts 1 to 10 opens the operate circuit of all other tens relays rendering the sender control relays individual to the relays of the first tens group. At its contacts 5, relay T700 extends ground potential from back contacts 3 of relay S707, to wire T–GRD, and over cable 770 to the digit wire D–1, corresponding to the tens location of the operated control key. This ground potential on digit wire D–1 is extended over cable 780 to contact 3 of the lower level of the bank of the switch S716.

Start relay S700, being in series with any line relay and its corresponding tens relay, is provided with an auxiliary relay S701 to control the operation of the control relays.

Pulser relays S702 and S703 provide the desired time interval of the "pulses" transmitted as well as determining the interdigit and internumber time intervals.

Pickup relay S704 operates when the first impulse of any digit is transmitted and remains operated during the digit period when pulses are transmitted.

Stop relay S705 operates to terminate the transmission of impulses when the number of impulses in each digit transmitted corresponds to the tens and units location of the marked control key and its marked position.

Tens transfer relays S706 and S707 operate on completion of the transmission of the impulses constituting the tens digit and transfer the digit wire control ground from the tens ground wire T–GRD to the units ground wire U–GRD.

Units transfer relays S708, S709, S710, and S711 operate on completion of the transmission of the impulses constituting the units digit and effect the operation of the cutoff relay associated with the operated line relay.

Clearout relays S712, S713, S714, and S715 operate to clear out the sender equipment and provide switch-through and clearout time intervals.

Alarm relay 758 operates and furnishes an alarm indication if trouble occurs in the circuits associated with the digits wires.

The operation of start relay S700 operates start auxiliary relay S701. Contacts 1 of relay S701 closes the line loop of outgoing circuit OC–A by connecting wire 774 to wire 775 through break contacts of units transfer relay S711 and through break contacts 1 of relays S703 or S704. At its contacts 2, relay S701 places ground on common locking wire 781 and at its contacts 5 locks itself operated to ground potential at break contact 2 of clearout relay S714. Contacts 7 places ground potential on driver control wire DC–1 which extends to the driver relays A and B of the choice allotter causing it to advance to the next position in the manner described in the noted Bellamy and Bowser application. Contacts 6 of relay S701 opens the homing circuit of the stepping magnet SM–715. Contacts 4 prepare an operating circuit for the stepping magnet. Contacts 3 place ground potential to the winding of the first pulser relay S702 through break contacts 2 of the second pulser relay S703.

Ground potential causes pulser relay S702 to operate, closing an operating circuit for pulser relay S703 at its make contacts. Relay S703 operates and at its contacts 2 opens the operate circuit of relay S702 causing it to restore. The restoration of relay S702 opens the operate circuit of relay S703, causing it to restore and close the operate circuit for relay S702 again. Therefore, as long as relay S701 remains operated, pulser relays S702 and S703 will operate in sequence. Resistances 716 and 717 are in parallel with the windings of relays S702 and S703 respectively and lengthen the normal operate and release time of these relays, providing a timer of variable timing intervals depending on the values of the resistances. It is assumed that the values of resistances 716 and 717 are such that one cycle of operations of the pulser is relays completed in 100 milliseconds, that is, pulser relay S703 operates 50 milliseconds after the operation of the first pulser relay S702 and remains operated for 50 milliseconds. The time interval of 50 milliseconds in which relay S703 is operated will be termed the pulse period and the time interval of 50 milliseconds in which relay S703 is restored will be termed the pulse interval.

The line loop is closed by the operation of relay S701 causing the remotely-located receiver circuit to be seized. On the first operation of relay S703, the opening of contacts 1 of relay S703 is ineffective as the line loop is maintained closed by contacts 1 of relay S704. However, on the first operation of relay S703, ground potential is extended through make contacts 3 of relay S703 and break contacts 3 of stop relay S705 to the winding of the stepping magnet SM715, energizing it. As previously pointed out, the stepping magnet does not advance until the completion of the driving pulse, hence magnet SM–715 does not advance during the pulse period.

When relay S703 restores, its contacts 1 close and its contacts 3 remove ground potential from the winding of the stepping magnet SM–715, advancing the brushes 777 and 778 from their home position 1 to position 2.

Ground potential from contacts 2 of the upper bank of the stepping magnet is extended through brush 778 to the lower winding of pick-up relay S704, operating it. Contacts 1 of relay S704 open, leaving the line loop closed by contacts 1 of pulser relay S703, and at its contacts 4, opens the operate circuit of tens-transfer relay S706.

The next pulse period of the pulsing relays, opens contacts 1 of relay S703, which opens the line loop across outgoing circuit OC–A, thereby transmitting one impulse to the remotely-located receiver. At the same time, contacts 3 of relay S703 extends ground potential to the winding of the stepping magnet again.

The line loop remains open for the pulse period of 50 milliseconds, whereupon it is closed by the restoration of relay S703. With this restoration, stepping magnet SM–715 advances to the next position, position 3.

In position 3, ground potential through brush 778 maintains pickup relay S704 operated and ground potential from the first digit wire D1 (originating at break contact 3 of relay S707) is extended through brush 777 to the winding of stop relay S705, operating it. Contacts 1 of relay S705 shunt contacts 1 of relay S703 so that the next operation of the pulser relay S703 will not transmit another pulse to the noted receiver; contacts 2 lock relay S705 operated to common ground wire 781 through make contacts 3 of relay S704 or break contacts 1 of relay S707; contacts 3 open the operate circuit of the stepping magnet SM–715 and prepares an operate path for relay S706; and contacts 4 connect brush 778 to wire 779. Ground potential on contacts 3 to 13 of the upper bank of the stepping magnet being extended over wire 779 to the homing contacts of the magnet causes it to advance rapidly to position 14.

While homing (advancing from position 3 to position 14), relay C705 remains operated through its noted locking contacts 2.

Upon reaching position 14, ground potential is removed from brush 778 and pickup relay S704 restores, closing its contacts 4 in preparation for the operation of tens transfer relay S706.

Assuming the homing operation of the stepping magnet is not completed before the pulses relay S703 operates for the next pulse period, ground potential through make contacts 3 of relay S703 is on make contacts 3 of relay S705 thereby operating relay S706 through break contacts 2 of relay S707 and break contacts 4 of relay S704 when relay S704 restored as noted.

Assuming now, that the homing operation of magnet SM–715 is completed before relay S703 operates during the next pulse period, relay S704 is restored as noted, and the operate path of relay S706 is completed to make contact 3 of relay S703. Operation of relay S703 for the next pulse period places ground potential on the winding of relay S706, operating it.

In either case, relay S706 remains operated from the ground potential through contacts 3 of relay S703 during the pulse period. This ground potential is also on one side of the winding of relay S707 while ground potential from contacts 2 of relay S701 through contacts of tens transfer relay is on the other side of the winding, shunting relay S707.

When relay S703 restores after the pulse period, relay S707 operates in series with relay S706 to ground potential at contact 2 of relay S701. Contacts 3 of relay S707 transfer ground potential from wire T–GRD to U–GRD removing ground potential from the tens digit wire D–1 and placing it on the units digit wire D–2 over wire U–GRD in cable 790 and contacts 5 of the operated line relay L701. This potential is further extended over digit wire D–2 in cable 780 to contact 4 of the lower bank of the switch S715. Since the contacts 3 to 12 are multiplied to contacts 16 to 25 of the lower bank of switch S716, this ground potential is also placed on contact 17. Contacts 1 open the locking circuit of the stop relay S705, restoring it.

The next operation of relay S703, with relay S704 and S705 restored extends ground potential to the winding of stepping magnet SM–716, energizing it. The line loop across wires 774 and 775 is closed at contacts 1 of pickup relay S704, thereby preventing a pulse from being transmitted.

When relay S703 restores, upon completion of the pulse period, magnet SM–716 advances its brushes 777 and 778 to position 15, whereupon ground potential is extended through brush 778 to the winding of pickup relay S704, operating it. Pickup relay S704 locks through its contacts 2 and make contacts 1 of operated relay S707 to ground potential at contact 2 of start relay S701.

The next operation of pulser relay S703, at its contacts 1 opens the line loop across wire 774 and 775 for the time interval of one pulse period. At the same time, its contacts 3 places ground potential on the winding of the stepping magnet energizing it.

When relay S703 restores, the line loop is again closed, completing the transmission of one "pulse" of the second digit being transmitted. Its contacts 3, remove ground potential from magnet SM–716, advancing it to position 16. In this position, brush 777 is on the contact associated with digit wire D–1, however, since the line relay operated placed ground potential on digit wire D–2, brush 777 is ineffective.

The next operation of relay S703 opens the line loop again for the second "pulse" of the second digit and at the same time energizes the winding of the stepping magnet. When the pulse period is completed, magnet SM–716 advances to position 17 and the line loop is closed at contacts 1 of pulser relay S703, completing the second "pulse" of the second digit. Ground potential on digit wire D–2 (placed there by the operation of relay S707) is extended through brush 777 to the winding of stop relays S705, operating it. Relay S705 locks operated through its make contacts 2 and make contacts 3 of pickup relay S704. Contacts 1 of the stop relay prevents the next operation of relay S703 from closing the line loop for the third "pulse"; contacts 4 connects its brush 778 to wire 776 extending to the winding of the stepping magnet through the homing contacts of switch S716; and contacts 3 transfer the magnet operating wire from wire 766 to the winding of units transfer relay S709. The switch S716 homes to its position I as ground potential on contacts 11 to 26 advances it to a position where no ground potential is present. In its home position, both brushes 777 and 778 are ineffective but relays S704 and S705 remain operated over their hereinbefore noted locking paths.

The next operation of relay S703 extends ground potential to the winding of S708 relay operating it. This ground potential also appears on one side of the winding of relay S709 and ground potential from the common ground wire S781 is present on the other side of the winding, shunting relay S709, preventing its operation. When relay S703 restores, relay S709 operates in series with relay S708. Contacts of relay S709 prepares an operate path for relay S710.

The next operation and restoration of relay S703, operates relays S710 and S711 in the manner described for relays S708 and S709. When relay S710 operates, its contacts 2 place ground potential on cutoff relay control wire CO–C extending to the winding of the cutoff relay associated with the operated line relay over cable 790, contacts 4 of the operated tens relay 701, over cutoff wire CO–1 in cable 770 and through contacts 1 of line relay L701, operating cutoff relay C701. When relay C701 operates, it locks operated through its make contacts to ground potential on the control wire 302 associated therewith. When relay S711 operates, its contacts 1 opens the line loop to the remotely located receiver thereby clearing it out in preparation for another call. Its contacts 3 open the operate circuit of the start relay S709, the operated tens relay, and the operated line relay, restoring them.

The restoration of start relay S700 opens the operate circuit of start auxiliary relay S701, however, relay S701 remains operated over its hereinbefore noted locking circuit. The restoration of tens relay T709 removes the marking ground potential from all digit wires and restores cutoff relay D in preparation of another "call." The restoration of line relay L701 closes the make-before-break chain of contacts permitting another "call" to be made.

The next two pulse cycles (operation and restoration) of pulses relay S702 operates relays S712 and S713 in series and relay S714 and S715 in series in the same manner in which relays S708 and S709 operated.

When relay S715 operates, its contacts 2 open the locking circuit of start auxiliary relay S701, restoring it. The restoration of relay S701 removes ground potential from common ground wire 781, restoring all operated sender control relays, thereby clearing it out.

The sender SE–700A has responded to the control exercised over it by the operation of a control key, by transmitting a two-digit number to the associated remotely located receiver, this number corresponding to the key and the position of the key that initiated the "call."

Briefly, operation of control key K300 from the left position L to the right position R caused sender SE–700A to transmit the two-digit number 12 to the remotely-located receiver as control key R300 in position R corresponds to the second line relay in the first tens group. If key K334 wire operated from position R to position L, the sender SE–700A would transmit the two digit number 78 as control key K334, position L corresponds to the next to the last line relay L768 in the seventh line group. In this case, during the operation of the sender control relays, ground potential would first appear on tens digit wire D–7 and then on units digit wire D–8 causing the number 78 to be transmitted. Likewise, if the position of key K344 were changed to the right position R, ground potential appearing on digit wires D–0 for both digits (line relay L799 and tens relay T709 operating) sender SE–700A would transmit the number 00. In all cases, when the sender completed its transmission of numbers, the cutoff relay associated with the new position of the last operated control key, operates and disassociates the sender equipment from the concerned control key.

Assuming the pulse cycle time to be 100 milliseconds (one operation and one restoration of relay S703), the remotely-located receiver is seized for a period of 150 milliseconds before the first pulse is delivered; the time between digits is 250 milliseconds; and the time allowed for the switchthrough operations of the receiver is 200 milliseconds. The seizure time is determined by the number of operations of the pulses S703 before pickup relay S704 operates; the interdigit time is determined by the operation of the tens transfer relays (100 ma.) plus the number of timing cycles before pickup relay S704 operates on the start of the second digit; the switch-through time is determined by the operation of the four units transfer relays; and the clearout time is determined by the operation of the four clearout relays.

Alarm relay 758 provides an alarm indication if for reason ground potential does not appear on any of the digit wires D–1 to D–0 during the sending operation of the sender. Alarm relay 758 has one side of its upper winding connected to contacts 13 and 26 of the lower level of switch S716 and the other side connected to ground potential. If stop relay D705 operates from ground potential on any digit wire, when brush 777 reaches position 13 or 26, the locking ground potential on the winding of the stop relay shunts alarm relay 758, preventing its operation. However, if stop relay S705 is not operated when brush 777 reaches position 13 or 26, ground potential from the winding of relay 758 operates the stop relay S705 in series with the alarm relay 758. The stop relay locks operated over its hereinbefore noted locking path and the alarm relay locks operated through its lower winding, its locking contacts, alarm lamp L758 and alarm release key K758 to ground potential. The alarm lamp L758 lights furnishing an alarm indication, informing the dispatcher of the alarm condition. The alarm lamp may be extinguished by operating release key K758, thereby restoring relay 758.

After an alarm condition is present, the sender equipment functions normally on other calls as the locking circuit of alarm relay 758 is external to the sender circuit.

*Receiver operation (Fig. 8)*

The operation of receiver RE–800A in responding to transmitted control from the remotely-located sender SE–700A will now be described with reference to Fig. 8, parts 1 and 2.

Referring now to Fig. 8, part 1, it will be observed that the receiver control relays include the following:

Line relay 800 which operates and restores according to the closing and opening of the line loop across outgoing circuit OC–A;

Release relay 801 which operates responsive to the seizure of receiver RE–800A by sender SE–700A and remains operated until the receiver is released;

Series relay 802 which operates at the start of each digit and remains operated until the dialing of the digit is completed;

Tens transfer relays 803 and 804 which operate on completion of the dialing of the first digit to transfer the switch driving wire 849 from switch 815 to switch 816;

Group relay 805 which operates of the first digit when it is greater than 5, to advance switch 816 to the portion of its bank associated with the digit wires having the tens wires greater than 5;

Switch 815, which as hereinbefore noted, is a ten-point minor switch which advances to its next position on the start of any driving pulse delivered to the winding of the stepping magnet SM815, while release magnet RM815 restores the switch to its home position; and Switch 816 is a switch similar to switch S716 of sender SE–700A in which it advances to its next position on the completion of the driving pulse.

Receiver RE–800A is connected to a remotely-located sender such as SE–700A over a two-wire circuit such as outgoing circuit OC–A. The number-response relay control wires interconnect the receiver and number-response relays, such as NRR–500A. The receiver responds to sender control over circuit OC–A and the receiver controls the number-response relays according to the received sender control.

The response of receiver RE–800A to received control and its control exercised over the number-response relay will now be described.

As hereinbefore noted, when the receiver RE–800A is taken for use the line loop across circuit OC–A is closed and after the interval of seizure time, the loop is opened and closed according to the value of the first digit. The line loop is then closed for the interval of interdigit time, whereupon it is opened and closed according to the value of the second digit. After the second digit is completely "dialed" the line loop is held closed for the interval of switch-through time and then opened to release the receiver from use.

Assuming the control key K334 is operated to the left position L, as hereinbefore described, sender SE–700A transmits two series of impulses comprising the two digits corresponding to the switch and switch position. In this case, sender SE–700A transmits six pulses for the first digits and nine pulses for the second digit.

When the line loop is closed across circuit OC–A, current flowing through the windings of line relay 800 from the battery and ground potential, operates line relay 800. Contacts on relay 800 operates release relay 801, which at its contacts 2 and 3 extends ground potential to brushes 810 and 811 of switch 815.

When the line loop is opened for the first pulse of the first digit, relay 800 restores for the pulse period time of 50 milliseconds and extends ground potential through make contacts 1 of relay 801, over switch driving wire 849, through break contacts 1 of relay 804 to the winding of series relay 802 and through break contacts 2 of relay 804 to wire 844 extending to the winding of stepping magnet SM815.

Relay 802 operates and magnet SM815 advances to position 1. Contacts 2 of relay 802 transfers ground potential from brush 810 to the winding of tens transfer relay 803, operating it. Contacts 1 of relay 803 extends ground potential to one side of the winding of relay 804 while the operating ground potential for relay 803 is on the other side, thereby shunting relay 804. When the line loop is closed upon completion of the first pulse of the first digit, relays 801 and 802 remain operated for a time interval greater than the time interval between pulses of any one digit by reason of the sleeved relay coil, rendering these relays slow-release.

The remainder of the six pulses constituting the first digit, restore and reoperate the line relay 800 six times, placing a pulse of ground potential on driving wire 849 each time it restores. During this time, relays 801 and 802 remain operated and magnet SM815 advances on each pulse, reaching position 6 on completion of the sixth pulse of the first digit 6. Brush 811 of switch 815 extends ground potential over wire 848, connected to contact 6, and through contacts 5 of relay 804 to the winding of group relay 805, operating it.

Relay 805 locks through its contacts 6 to its operating ground potential; at its contacts 3, it connects brush 821 of switch 816 to the winding of the stepping magnet SM816 over wires 847 and 848 and the homing contacts of magnet SM816; at its contacts 1 it places ground potential on wire 842 which extends to brush 821 of switch 816; at its contacts 2, it connects wire 849 to wire 850 independent of contacts on relay 804; and at its contacts 5 opens the circuit of brush 810 of switch 815.

The ground potential on wire 842 is extended through contacts 1 of switch 816 and through brush 821 to the winding of magnet SM816 over the noted path, advancing the switch to position 2. Contacts 2 to 13 of the level of switch 816 associated with brush 821 cause the switch 816 to home to position 13.

Since six pulses constituted the first digit, the line loop is closed for the interdigit time interval, as previously pointed out determined by the sender SE–700A. This interval of time is greater than the slow-release time of relay 802, therefore relay 802 restores. Ground potential from contacts of relay 800 maintains relay 801 operated.

The restoration of relay 802 removes the shunting ground potential from relay 804 thereby permitting relay 804 to operate in series with relay 803. Contacts 2 of relay 804 transfer the magnet driving wire 849 from wire 844 extending to switch 815 to wire 845 extending to switch 815. During this interdigit time interval, the homing of switch 816 is completed and the receiver is prepared to receive the pulses of the second digit.

The opening of the line loop for the first pulse of the second digit restores relays 800, which at its contacts 1 transmits a ground pulse over wire 849 to the winding of relay 802, operating it, and to the winding of stepping magnet SM815 over wire 845 through contacts 2 of relays 804 and 805.

The operation of relay 802 extends ground potential through its contacts 2 and make contacts 4 of relay 804 to the lower winding of relay 805. Since the upper and lower windings of relay 805 are differentially connected as indicated by the arrows, the flux of the lower winding neutralizes the flux of the upper winding, restoring relay 805. Contacts 1 of relay 802 maintain the ground pulse on wire 845 after relay 805 restores.

On completion of the first pulse, switch 816 advances to its position 14, the first position in the second half of the switch bank.

The remainder of the pulses of the second digit cause relay 800 to restore and reoperate, driving switch 816 to position 23, the ninth position in the second half of the bank. During this pulsing time relay 802 remained operated, maintaining brush 810 of switch 815 inoperative.

On completion of the "dialing" of the second digit, relay 800 remains operated for the hereinbefore noted switch-through time, thereby restoring relay 802, as the switch-through time interval is greater than the holdover time of relay 802. At this point, switch 815 is in position 6 and 816 is in position 23.

Ground potential from contacts 2 of relay 801 is extended through back contacts 2 of restored relay 802, through back contact 5 of restored relay 805 to brush 810 of switch 815. This ground potential is extended through contact 6 of switch 815, over wire 831 extending to switch 816, through brush 822 and contact 23 of switch 816 to wire 568 extending to number-response relay NRR–500A. As hereinbefore pointed out, ground potential on wire 568 restores the associated relay 534, if operated, to cause the switchgear equipment, such as relay 1668, to operate.

After the switchthrough time interval has elapsed, the line loop across circuit OC–A is opened, thereby restoring relay 800. After the slow-release time of relay 801 has elapsed, it restores, placing ground potential on wire 843 extending to the release magnet RM815 of switch 815 through the off-normal contacts ON. The release magnet RM815 operates, restoring stepping magnet SM815 thereby returning switch 815 to its home position and opening the off-normal contacts ON, restoring release magnet RM815. The restoration of relay 801 removes locking ground potential from relays 803 and 804, restoring them. Ground potential is also removed from wire 568 however, as hereinbefore pointed out, the relay associated therewith is a residual-stick relay and does not need holding current to maintain it operated.

With all relays restored and switch 816 in position 23, ground potential on brush 821 is extended to the winding of magnet SM815 through its homing contacts, wire 846, contacts 3 of restored relay 804 and wire 847. Since ground potential is on contacts 24 to 26, magnet SM816 advances to its position 1, which has no ground potential on it as make contacts 1 of relay 805 is open. All relays are now restored and both switches are in home position. The receiver RE-800A effected the necessary control over the selected number-response relay according to the received digits. Receiver RE-800A is now prepared to receive another "call."

Assuming the received number contained digits in which the first digit is smaller than 6, relay 805 would not operate. Hence the second digit causes switch 816 to step through the first half of the contact bank in order to reach control wires 500 to 549. After the second digit is received, switch 816 is homed to position 14. After clear-out of the receiver control relays, back contacts 1 of relay 805, place ground potential on wire 841 extending to contact 14 of switch 816, through brush 821 and contacts 3 of relay 804 to the winding of magnet SM815. Switch 816 is thereby homed to its position 1 in preparation for another "call." This noted homing path will home switch 816 to position 1 if it is moved from its home position without a "call" being initiated.

We claim:

1. In a remote control system including a control station and field devices under the control thereof, each field device being capable of assuming any one of a plurality of positions, position-control wires extending from the control station to each field device comprising respective wires for the said positions of such device, position-control means at the control station for maintaining any said control wire of any field device energized continuously according to the position currently desired for such field device, response means in each field device responsive to the said continuous energization of any said associated control wire for causing the field device to assume and maintain the corresponding position, and means local to any said field device for opening each of the control wires thereof between the control station and the response means of such field device and for energizing the local end section of any desired opened wire.

2. In a remote control system as set forth in claim 1, said local means including one means operable to open the control wire currently energized by the control station and including another means for locally energizing the local end section of any desired control wire dependent upon the said one means being in operated condition.

3. In a remote control system as set forth in claim 2, said one means comprising locally operable relay means for opening the control wires, and including means for closing a self-locking circuit over the control-station end of the wire currently energized at the control station for maintaining the opened condition and for maintaining said other local means effective.

4. In a remote control system as set forth in claim 2, said one means including local cutoff relays for opening the control wires respectively, means responsive to the operation of any cutoff relay for closing a self-locking circuit subject to the associated control wire being currently energized at the control station.

References Cited in the file of this patent

UNITED STATES PATENTS

| | | |
|---|---|---|
| 1,587,121 | Harlow | June 1, 1926 |
| 1,674,127 | Bellamy | June 19, 1928 |
| 1,689,294 | Potts | Oct. 30, 1928 |
| 1,708,989 | White | Apr. 16, 1929 |
| 1,745,071 | Wensley | Jan. 28, 1930 |
| 1,765,538 | Nelson | June 24, 1930 |
| 1,803,614 | Hershey | May 5, 1931 |
| 1,882,010 | Hershey | Oct. 11, 1932 |
| 1,888,985 | Hershey | Nov. 29, 1932 |
| 2,107,902 | Oliver | Feb. 8, 1938 |
| 2,170,694 | Perry | Aug. 22, 1939 |
| 2,205,894 | White et al. | June 25, 1940 |
| 2,205,895 | White et al. | June 25, 1940 |
| 2,305,213 | Wicks | Dec. 15, 1942 |
| 2,388,733 | Fischler et al. | Nov. 13, 1945 |